US012710755B2

(12) United States Patent
Xi et al.

(10) Patent No.: US 12,710,755 B2
(45) Date of Patent: Aug. 18, 2026

(54) GROUND SURFACE MULTI-MODAL INSPECTION ROBOT

(71) Applicant: THE UNIVERSITY OF HONG KONG, Hong Kong (CN)

(72) Inventors: Ning Xi, Hong Kong (CN); Qingyang Wang, Hong Kong (CN); Siyu Wang, Hong Kong (CN); Yongji Sheng, Hong Kong (CN)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 150 days.

(21) Appl. No.: 18/491,994

(22) Filed: Oct. 23, 2023

(65) Prior Publication Data

US 2024/0152147 A1 May 9, 2024

Related U.S. Application Data

(60) Provisional application No. 63/423,226, filed on Nov. 7, 2022.

(51) Int. Cl.
*G05D 1/00* (2024.01)

(52) U.S. Cl.
CPC ......... *G05D 1/0212* (2013.01); *G05D 1/0248* (2013.01); *G05D 1/0255* (2013.01);
(Continued)

(58) Field of Classification Search
CPC ........... G05D 2105/89; G05D 2107/24; G05D 2109/10
See application file for complete search history.

(56) References Cited

U.S. PATENT DOCUMENTS

| | | | | |
|---|---|---|---|---|
| 9,967,701 | B1 * | 5/2018 | Barfield, Jr. | G01C 21/20 |
| 12,253,352 | B1 * | 3/2025 | Gold | G02B 6/02076 |

(Continued)

FOREIGN PATENT DOCUMENTS

CN 212128782 U 12/2020

OTHER PUBLICATIONS

Jovančević, I., Pham, H.-H., Orteu, J.-J., Gilblas, R., Harvent, J., Maurice, X., & Brèthes, L. (2017). 3D point cloud analysis for detection and characterization of defects on airplane exterior surface. Journal of Nondestructive Evaluation, 36(4). (Year: 2017).*

(Continued)

*Primary Examiner* — Hitesh Patel
*Assistant Examiner* — Tabitha Kress
(74) *Attorney, Agent, or Firm* — Leason Ellis LLP

(57) ABSTRACT

A system for inspecting surfaces that includes a mobile base, sensors for base navigation, sensors for surface inspection, a communication system and a host computer that executes modules for base motion planning and navigation, location, point cloud acquisition and processing, surface modelling and analysis, multi module coordination and user interfaces. The inspection procedure has the robot move in a zigzag pattern trajectory over the surface. For every fixed distance, a 3D point cloud of the surface is generated and the location of the point cloud with respect to the world coordinate system is recorded. The location of the point cloud is based on SLAM for spatial mapping. At the same time, a high-resolution photo of the corresponding area on the surface is recorded by the camera. Both the point cloud and the photo are transmitted to the host computer for processing and analysis. This information is used in a new 3D detection and image processing algorithm to find flaws in the surface like bumps or depressions. If irregular flaws are detected, the robot marks such a problematic location.

11 Claims, 9 Drawing Sheets

(52) U.S. Cl.
CPC ........... *G05D 1/027* (2013.01); *G05D 1/0274* (2013.01); *G05D 1/0278* (2013.01)

(56) References Cited

U.S. PATENT DOCUMENTS

| | | | | |
|---|---|---|---|---|
| 2013/0231779 | A1 | 9/2013 | Purkayastha et al. | |
| 2018/0057283 | A1* | 3/2018 | Peters | B25J 5/007 |
| 2020/0192388 | A1* | 6/2020 | Zhang | G05D 1/648 |
| 2021/0406560 | A1* | 12/2021 | Park | G06T 7/70 |

OTHER PUBLICATIONS

Civil Aviation Authority. (2006). CAP 562 Civil Aircraft Airworthiness Information and Procedures [Leaflet]. Civil Aviation Authority. (Year: 2006).*

Sioma, Andrzej. (2019). 3D imaging methods in quality inspection systems. 91. 10.1117/12.2536742. (Year: 2019).*

Kusalovic, D. (1998). Navigation system for semi-autonomous tracked machines (T). University of British Columbia. (Year: 1998).*

Xie, Xianghua. (2008). A Review of Recent Advances in Surface Defect Detection using Texture analysis Techniques. ELCVIA. Electronic letters on computer vision and image analysis, ISSN 1577-5097, vol. 7, No. 3, 2008 (Ejemplar dedicado a: Quality Control by Artificial Vision), pp. 11-22. 7. (Year: 2008).*

Nolan, S. P. (2007). A high frequency wide field of view ultrasonic sensor for short range collision avoidance applications on intervention class underwater vehicles (Version 1). University of Limerick. (Year: 2007).*

Jessie (Aug. 16, 2019). Spray Chalk Everywhere! Birthday party fun for the 12 year old twins . . . Jessie at Home. (Year: 2019).*

Discgolf [BoHackJorseman]. (May 13, 2020). Spray chalk [Comment on the online forum post "Very temporary markings for a tournament?"]. Reddit. (Year: 2020).*

Turf Tank. (Dec. 2, 2020). Turftankone. (Year: 2020).*

* cited by examiner

N
S
E
W
Tracking Status

Data Stream $GNVTG,53.350,T,56.554,M,0.00487,N,0.00903,K,D*3E
#HEADINGA,COM2,0,56.0,FINE,2276,379156.800,700697,11,18;SOL_COMPUTED,NAR
#RTKPOSA,COM2,0,56.0,FINE,2276,379156.900,700796,4,18;SOL_COMPUTED,NARR
$GNGGA,091658.90,2215.56009310,N,11407.84556763,E,4,32,0.7,19.4724,M,-2.1000
$GNVTG,34.042,T,37.246,M,0.00339,N,0.00628,K,D*3B
#HEADINGA,COM2,0,56.0,FINE,2276,379156.900,700796,12,18;SOL_COMPUTED,NAR
#RTKPOSA,COM2,0,56.0,FINE,2276,379157.000,700897,3,18;SOL_COMPUT
Lon: 114.13075921 deg
Lat: 22.25966313 deg
Hgt: 17.3840 m
Vel: 0.0067 m/s
FixType: RTK Fixed
UTC: 09:18:53.900

GROUND SURFACE MULTI-MODAL INSPECTION ROBOT

CROSS-REFERENCE TO RELATED PATENT APPLICATIONS

This application claims the benefit of priority under 35 U.S.C. Section 119(e) of U.S. Application No. 63/423,226 filed Nov. 7, 2022, which is incorporated herein by reference in its entirety.

FIELD OF THE INVENTION

The present invention relates to robots for inspecting surfaces and, more particularly, to a robot that employs multiple inspection modes.

BACKGROUND OF THE INVENTION

Currently inspections of surfaces mainly rely on artificial visual inspection. This inspection process usually includes the steps of sprinkling the inspected surface or court with water and waiting for a couple of hours (2-3 hours) until most of the water has evaporated. If some areas in the court are not flat, residual water will remain in depressions in the surface. Such an inspection process is tedious and, in some sense, ad hoc. It often leads to inaccurate inspection results and low efficiency.

A prior automated system of detecting the flatness of a surface is disclosed in US Application Publication No. 2019-22376563. This publication relates to a system in which the spatial resolution is fixed and low (about 1 cm) because test needles are arranged in a fixed matrix structure and make contact with the ground. Depressions are only detected by off LED discrete signals without measuring the exact depth data. In order to detect the flatness of a large field like a tennis court, technical personnel need to place a needle bearing device multiple times. This can be dangerous because the personnel can be scratched by the test needles.

US Patent Application Publication No. 2019-22376563 discloses a system with a movable wheel linked with a detection device. It provides a detection width that is the wheel width (about 10 cm in a row). Also, the detection reference is built on the local surface where the front and rear support wheels are located. In order to detect flatness of a large field like a tennis court, technical personnel need to hold the handle and walk around the surface many times to fully cover the whole area.

A mobile inspection robot is disclosed in US Patent Application Publication No. 2013/0231779. This robot includes a robot body and a drive system supporting the robot body and configured to maneuver the robot over a work surface. A controller communicates with the drive system and a sensor system that includes a camera or ultrasound sensor. The controller executes a control system that includes a control arbitration system and a behavior system that are in communication with each other. The behavior system executes an inspection routine based on the execution of commands from the control arbitration system, which in turn are based on sensor signals received from the sensor system to identify and inspect electrical equipment. It particularly inspects switch status, temperature and humidity. However, this robot does not measure the flatness or other dimensionality of ground surfaces.

Thus, there is a need in the art for a fast and accurate way to determine the flatness of large courts, and preferably to do so without the need for a number of personnel.

SUMMARY OF THE INVENTION

The present invention is directed to a method for inspecting surfaces, e.g., the surfaces of courts used for sports such as tennis, basketball, badminton, etc. The invention employs hardware and software. The hardware includes a mobile base, sensors for base navigation, sensors for surface inspection, a communication system and a host computer. The software includes modules for base motion planning and navigation, point cloud acquisition and processing, surface modelling and analysis, multi module coordination and user interfaces.

The inspection procedure is as following: The robot is moved in a zigzag pattern trajectory over the court surface. For every fixed distance, a 3D point cloud of the surface is generated and the location of the point cloud with respect to a world coordinate system is recorded. The location of the point cloud is based on SLAM (simultaneous localization and mapping) for spatial mapping. At the same time, a high-resolution photo of the corresponding area on the surface is recorded by a camera. Both the point cloud and the photo are transmitted to the host computer for processing and analysis. This information is used in a new 3D detection and image processing algorithm to find flaws in the surface like bumps or depressions. If irregular flaws are detected, the robot marks each such problematic location.

The present invention significantly improves the accuracy of the inspection as well as its efficiency in order to provide high quality court facilities in a timely fashion to residents. The invention has three advantages: (1). The traditional inspection process usually includes covering the inspected court with water and waiting for a couple of hours until most of the water is evaporated. This takes too much time and requires a sunny day. The invention can finish more kinds of inspection processes (bump area, step-like irregular surfaces) at anytime. (2). In the prior system there is no record left when the water has evaporated, but with the invention all of the digital information of the flaws is recorded forever and they can be marked with spray paint. (3). There are too many recreational courts in large urban areas so that the portion of the government responsible for their maintenance has to spend too much time inspecting all these courts. Using the present invention, the inspections can be achieved by remote operation of the robot instead of requiring human inspectors on site every time.

BRIEF DESCRIPTION OF THE DRAWINGS

The foregoing and other objects and advantages of the present invention will become more apparent when considered in connection with the following detailed description and appended drawings in which like designations denote like elements in the various views, and wherein.

DETAILED DESCRIPTION OF THE INVENTION

Figure 1:
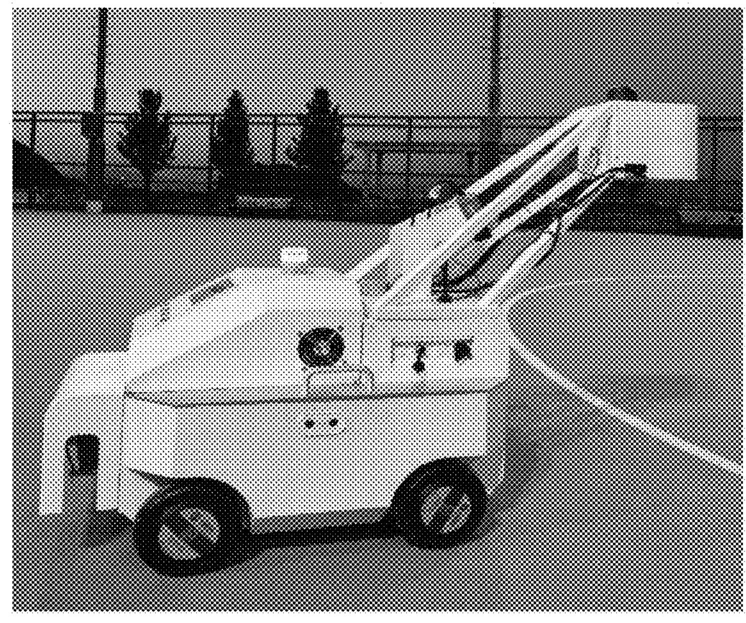
FIG. 1 is a photograph of a mobile surface inspection robot on a sport surface according to the present invention.

The invention includes a mobile robot that travels over the surface to be detected as shown in FIG. 1. This robot measures the flatness of the surface and sends that information to a host computer for analysis, which computer may be on the robot or at a remote location. The robot may also send and receive information from a user interface, e.g., by WiFi, in the form of a remote control panel that may be located with the host computer or at the site of the surface.

Figure 2:
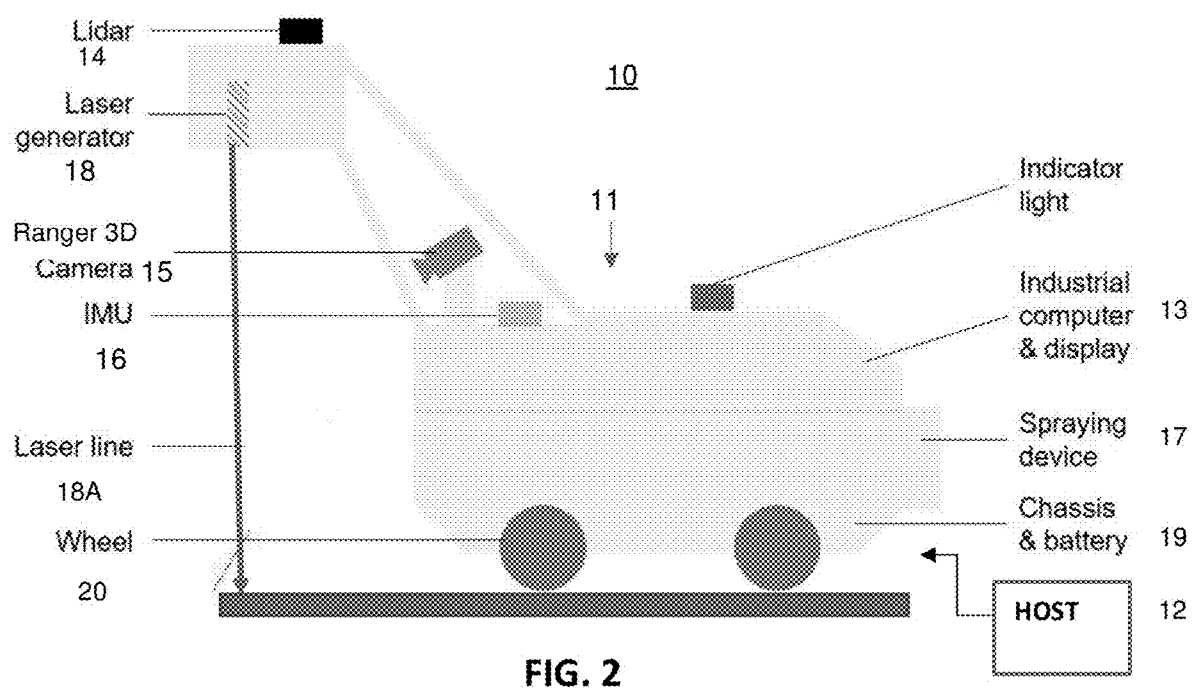
FIG. 2 is an illustration of the robot of FIG. 1 with various parts labelled.

The structure of the hardware of the inspection robot system 10 is shown in FIG. 2. The system includes a mobile robot 11 and a host (user) computer 12. Mounted on the robot is an industrial personal computer or controller 13, a locating radar (Lidar) 14, a 3D laser scanning camera 15, an ultrasonic safety protection sensor 23 (FIG. 3), an inertial measurement unit (IMU) 16, network equipment, defect marking mechanism such as a paint spraying device 17, a laser 18 that projects a laser line 18A and some non-standard mounting brackets. The mobile robot 11 is the carrier for some other equipment and includes a chassis, a battery 19 and wheels 20. When the robot receives a command from the operator, it can move on the wheels 20 driven by an electric motor powered by the battery 19.

The locating lidar 14 is the basic sensor for the mobile robot's navigation and location functions. The 3D laser scanning camera 15 is used for image acquisition, while the safety protection sensor generates ultrasonic waves to ensure the safety of the mobile robot during driving, i.e. to prevent collisions between the robot and objects that may be located on the surface. The IMU 16 is used to obtain the robot attitude data during its movement over the surface. This information is used to correct the acquired image. The network device 22 (FIG. 3) is used for real-time communication between the vehicle-mounted device and the host computer 12. The host computer is the central processing unit of the entire system. It provides outputs motion control, image processing, data calculation, and surface flatness results.

Figure 3:
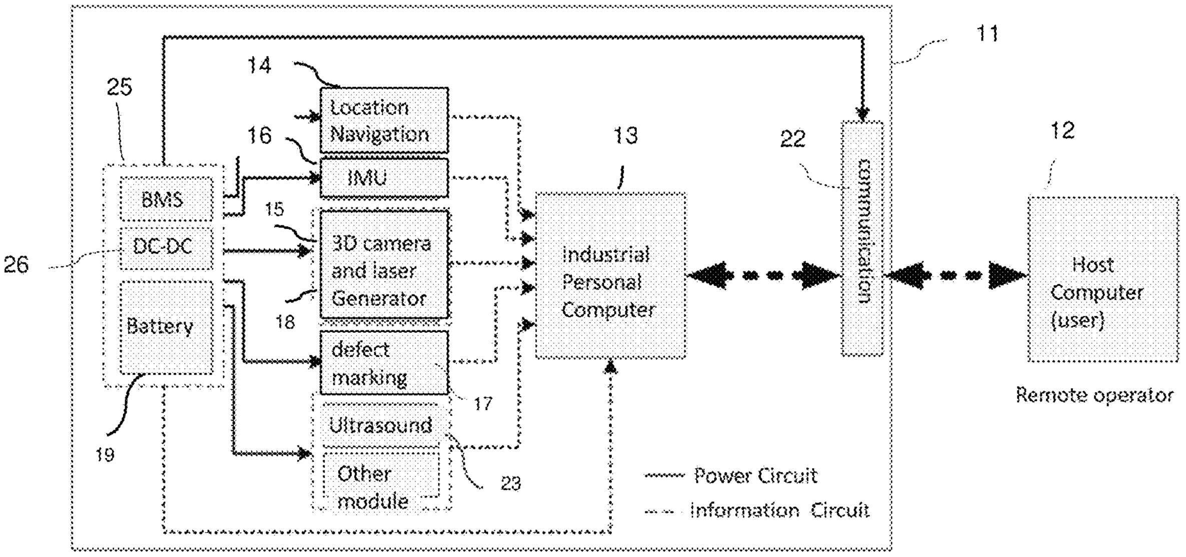
FIG. 3 is a block diagram of the control system for the inspection robot.

A block diagram of the control system for the inspection robot is shown in FIG. 3. The host computer 12 connects, e.g., via WiFi, with the communication unit 22. It in turn communicates with the industrial personal computer or controller 13. Power for the controller comes from battery 19 of a battery module 25, which also supplies power to Lidar 14, IMU 16, 3D cameral 15, laser generator 18, defect marking device 17, ultrasound generator for the protection sensor 23 and other modules. In turn, the controller 13 controls all of these devices and collects their measurements for transmission back to the host computer 12 via the communications unit 22.

The 3D camera 15 is connected via Ethernet to the controller 13. The IMU is connected to the controller via a RS485 serial communications. The locating lidar 14 is connected to controller via Ethernet and the ultrasonic source of the protection sensor is connected with the controller through RS485 serial communications. The controller 13 connects to the host computer 12 through 4G/5G/Wi-Fi or other communications protocols including hardwired.

The security module 23 uses ultrasonic radar, which is installed on all sides of the vehicle body to detect obstacles and prevent collisions.

As can be seen in FIG. 3, the power module 25 is composed of three hardware parts, i.e., a large-capacity lithium battery 19, a voltage regulating power supply 26 and a battery management system (BMS). It is the energy supply and distribution center of the whole robot. When the battery voltage is 24 V, considering that the overall weight of the robot is 50 kg, the rated discharge is about 8 A, and the battery capacity should not be less than 32 Ah so that it can meet the requirements for 4 hours of work.

When the robot operates, it needs different voltages for the modules, such as 5 VDC, 12 VDC, and 24 VDC. The output voltage of the battery is adjusted by the voltage regulating power supply 26 to meet the power consumption requirements for different pieces of equipment, and the voltage regulating power supply also plays a role in voltage regulation. The BMS in the Li-battery system assures that the battery system can work well under all kinds of circumstances.

The mobile robot is mainly driven by four wheel servo hubs (electric motors), and the front and rear wheels 20 are suspended by torsion beams, respectively. The robot can fully meet the needs for travel over various sports grounds.

The inspection robot's host computer 12 may be, for example, an Advantech EPC-C301, which is a compact, fan-less embedded system with diverse I/O ports for easy integration and diverse peripheral expansion. The EPC-C301 is designed for automated machines, smart parking, and self-service human machine interface (HMI) applications. The communication method between the host computer 12 and the controller 13 is typically WiFi. The functions of the host computer are (a) to compile and monitor the running program of the controller, (b) to obtain real-time running information from the inspection robot for the monitor, (c) to accept automatic control, remote control and other function settings from the user or operator and (d) to accept various programs and manual operation instructions for maintenance.

In one embodiment of the present invention Lidar 14 is the key equipment for navigation and determining the location of the robot. The working environment of this kind of robot is outdoors, so lidar with a higher protection level is required. The lidar adopts the mature time-of-flight (ToF) principle and non-contact detection, and adds the latest multiple echo detection technology (two echoes), so that it can accurately measure in harsh environments. The main features are: IP67 protection level, large monitoring range (360° scanning angle) and flexible regional configuration. At the same time, it has the advantages of a self-checking function, stable detection and insensitivity to objects with low reflectivity.

Figure 4:
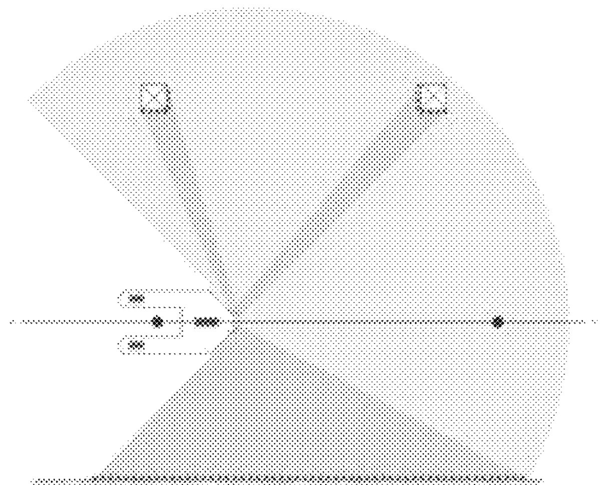
FIG. 4 shows a layout for the method of determining the location of the inspection robot.

The method of determining the location of the inspection robot is shown in FIG. 4. The precise reflector is set up around the inspection robot's motion path. The inspection robot transmits a laser beam and simultaneously collects the laser beam reflected by the reflector to determine its current position and direction. The inspection robot's initial position calculation is first made. If the inspection robot is stationary, the laser scanner can measure at least 4 beams, and at least 4 reflectors can be seen. At the precise position (X, Y) of the known reflectors, the inspection robot will continuously calculate the current position, associate the reflector according to the estimated new position, and correct its own position, so as to correct the next action.

After the construction of a stadium is completed, the whole field will be flat and generally there will be no obstacles during a detection process. Therefore, the lidar locating method with reflectors is used. A certain number of lidar reflectors are arranged on the edge of the field, and the robot can obtain higher positioning accuracy.

The IMU 16 is a gyroscope, which is used to detect the position and attitude of the robot during motion. In the detection process, tilted or uneven ground will cause a tilted deformation of the image measured by the 3D camera 15. By using the attitude data of the IMU, the tilted image can be corrected to obtain the correct image.

The 3D camera 15 measures range by using triangulation. This means that the object is illuminated with a line of light from one direction, and the camera measures the object from another direction. The most common lighting used when measuring range is a line projecting laser 18 that projects a laser line 18A. The camera analyzes the sensor images to locate the laser line in them. The higher up the laser line is found for a point along the x-axis (the width of the object), the higher up is that point on the object. When measuring range, there are two angles that are important: (a) the angle at which the camera is mounted and (b) the angle of the incoming light (incidence). Both angles are measured from the normal of the transport direction. The angle of the camera is measured to the optical axis of the camera—that is, the axis through the center of the lens as shown in FIG. 4.

The 3D camera and the laser generator are installed on a bracket in a fixed relative position. The bracket is installed on the inspection robot. When the inspection robot moves forward at a certain speed V, the laser generator 18 projects the line 18A to the ground. FIG. 1. Then, the 3D camera 15 catches the laser line at a certain frequency. In this way, the robot obtains the contour line of a laser line. Since the inspection robot is constantly moving, the 3D camera continuously obtains the contour line, and finally forms a scanning contour surface.

Defect marking can be implemented by using spray chalk to mark deflection areas. Such chalk is environmentally friendly and it can be washed away with water.

Figure 5:
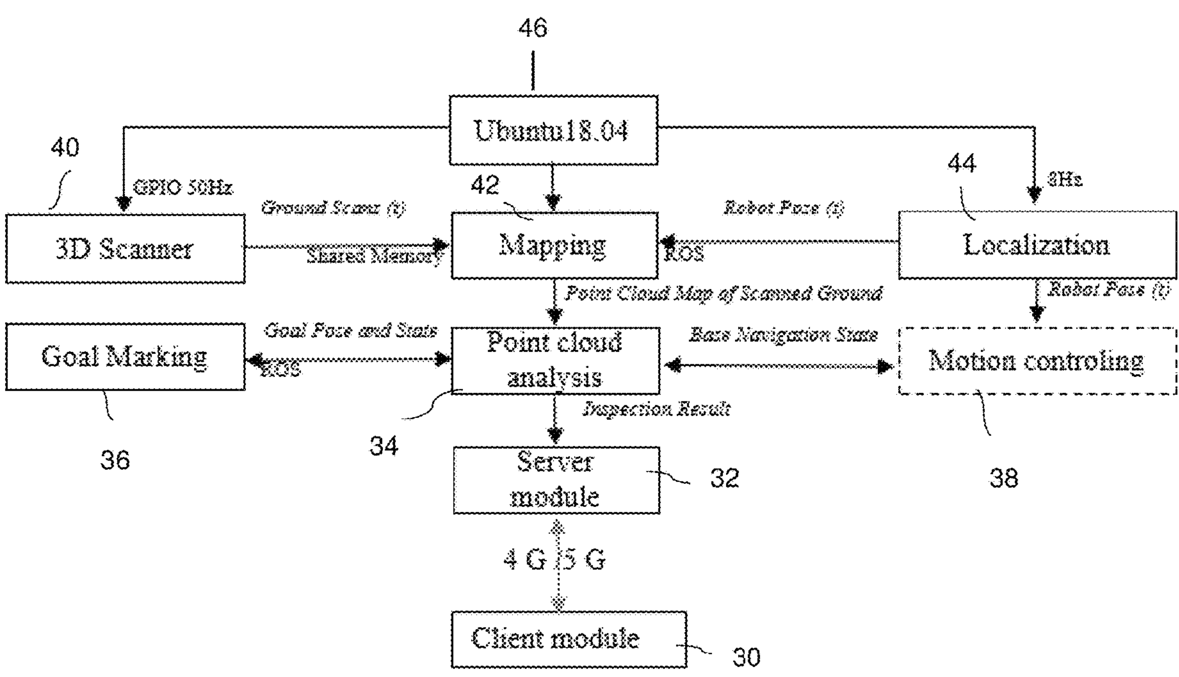
FIG. 5 is a diagram of the architecture of the inspection robot software system.

The architecture of the inspection robot software system is shown in FIG. 5. The robot software mainly includes the client module 30, which receives the robot pose information, point cloud/image and other key data from the inspection robot 11. In addition, the client module also sends commands to the robot, such as motion trajectory, motion speed, etc. A server module 32 is responsible for parameter initialization, local/wide network working mode exchange and application program setup. The 3D Scanner module 40 is responsible for capturing the laser points that hit the ground and then forming a small area point cloud about them. Mapping module 42 splices a small area of the point cloud into a large point cloud and delivers it to point cloud analysis module 34, which is responsible for analyzing each point in the point cloud to identify whether the height of each point meets the requirements. Goal marking module 36, which controls the apparatus that causes the robot to spray erasable paint on the ground to mark detected unqualified points on the ground, is controlled by a signal from the point cloud analysis module and provides an output to that module. Localization module 44 mainly produces the position and orientation information of the robot, and then sends out this information to other modules, such as motion control module 38 which receives the planned path and the position/orientation of the mobile robot. This motion control module controls the movement of the mobile robot according to the planned trajectory.

A client interface, which is part of the client module 30, performs the function of motion planning, automatic/manual remote operating mode selection, real-time monitoring and data analysis & evaluation. The motion planning module of the client interface includes the necessary input information such as the length and width of the court or other surface and the inspection velocity of the robot. Then the desired path is generated automatically and shown on a display screen of the client interface. The corresponding files are transferred (LAN mode or WAN mode) directly into the server module 32 that is installed on the inspection robot.

When in the automatic mode the interface shows the real-time status of the inspection procedures, including a live image, the pose of the robot and the progress rate. When in the manual mode the interface also shows the real-time status, but with a tele-operation function controlled by joysticks, i.e., the user interacts with and operates the robot from a remote location.

By the end of the inspection operation by the robot, i.e., once it has traversed or covered the entire field or court, all of the measured data will be transferred into the client interface, analyzed, and displayed. The whole map of the court will be shown on the interface display along with the bump cloud, depression cloud and the steplike cloud. In an exemplary embodiment, lighter colored places on the map can indicate higher altitude of the pose from the inspected court.

The server interface of server module 32 can perform the basic functions of parameter initialization, local/wide area network monitoring, data transmission and application program setup. This server interface panel is used to guarantee the normal running of the robot. Under a local data transmission mode, an attached router is used as a relay station for transmission. Under wide data transmission mode, the cloud server is used for relaying.

Figure 6:
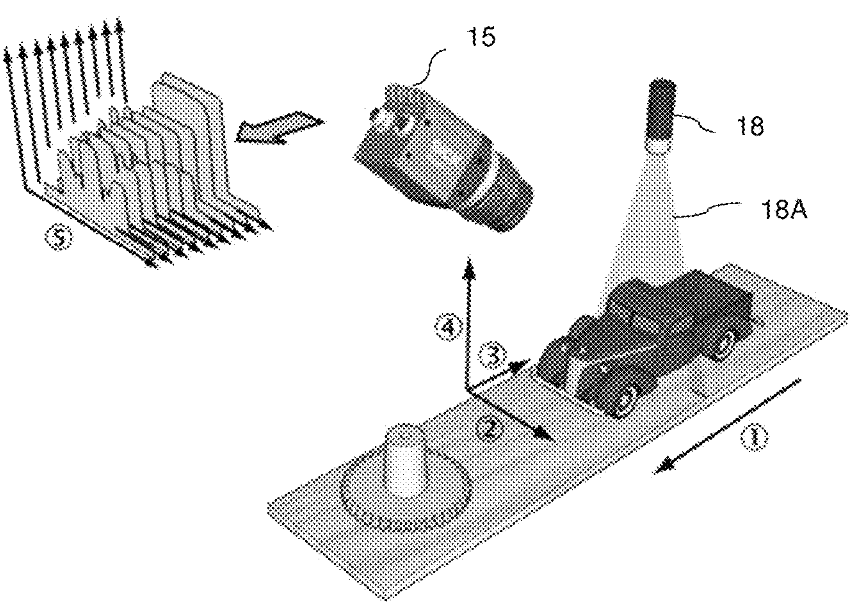
FIG. 6 illustrates the 3D scanner principle of the present invention.

The high precision 3D scanner 15 (FIG. 2) is the key to the inspection. It consists of an IR laser beam generator 18 and an industrial IR camera installed on the robot as shown in FIG. 6. With a high-intensity IR laser beam projected on the ground, the industrial camera can only capture the light with the IR wavelength of the laser beam, which eliminates the negative effect of different sun light and lighting conditions on the inspection field. The scanner system is well calibrated to convert a seen 2D IR laser beam image into a 3D points cloud line and achieve sub-millimeter (0.55 mm) scanning accuracy.

In FIG. 6 the robot moves in direction 1. Direction 2 is the Y-axis or robot width direction. Direction 3 is the X-axis or robot length direction. Direction 4 is the Z-axis or robot height direction. Items 5 in FIG. 6 are a series of scanning lines obtained at a certain frequency.

Note that the "Point cloud" not only includes the 3D pose (X, Y, Z), but also includes intensity (I) which indicates the IR light reflectivity of different material and texture on the ground.

The mapping system is synchronized by a global clock to match the scanning (50 Hz) with its pose (8 Hz) in the field World Reference Frame (W.R.F.) as a high precision simultaneous localization and mapping (SLAM) algorithm and general purpose input/output (GPIO) synchronization hardware design. As the robot moves around the field, a timer triggers the 3D Scanner. The same timer also triggers the localization module 44. Therefore, the "Point cloud (t)" can be transformed from the robot local reference frame to the field W.R.F. by measured "Pose(t)" of "Point cloud(t)." Then the 3D point cloud map (saved as "whole_map.ply") of the field can be obtained by continuously doing so.

This mapping module can focus on three types of goals: (a) tilting angle of the ground, (b) several types of 3D uneven ground flaws, and (c) 2D painted line position flaw. After the detection, some selected type of the flaw position is sent to the "marking module" so that the robot can leave a mark on the ground for later use, e.g., as an indication of a location that needs repairing.

Figure 7:
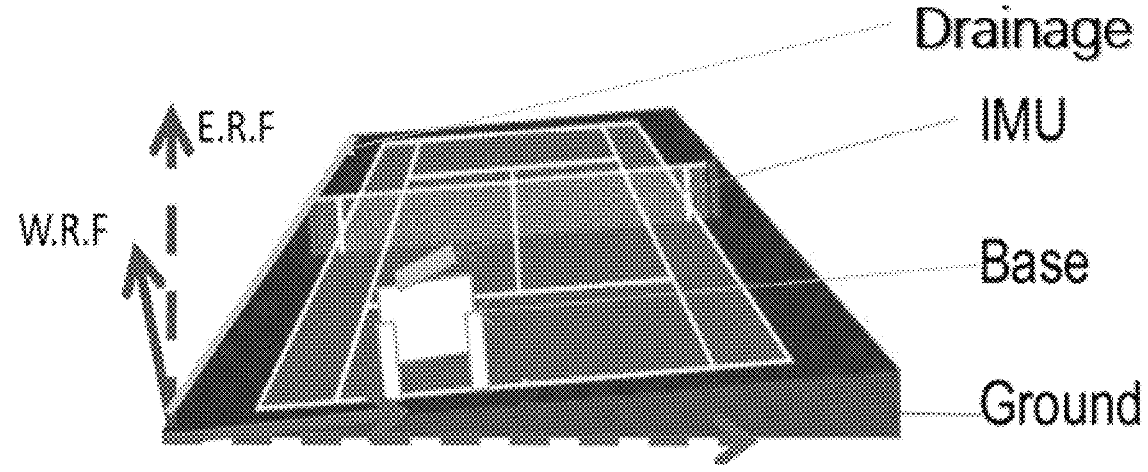
FIG. 7 shows the tilting angle of the field as the pitch and roll angle of W.R.F in E.R.F. with an xy-plane.

The ground surface is intended to have an inclination angle for drainage use; but the angle should be lower than 1:100 at any location. The tilting can be expressed by pitch and roll angles of W.R.F. in an earth reference frame (E.R.F) whose xy-plane is horizontal and which is measured by the onboard inertial measurement unit (IMU) 16 on the robot as shown in FIG. 2. The average overall tilting and abnormal tilting at any specific place is given after the robot finishes the field inspection. FIG. 7 shows the tilting angle of the field as the pitch and roll angle of W.R.F in E.R.F. with an xy-plane.

A "step-like" 3D uneven surface over 1 mm should not be at any position and direction. Detection of such a defect is carried out by an online local height filter which outputs the step-like height change above a certain value (1 mm). The abnormal step-like uneven ground would be saved as a point cloud in "steplike_cloud.ply."

Figure 8A:
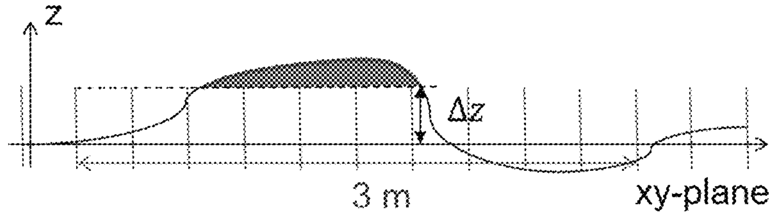
FIG. 8A is a graph of the local 3 m edge bumping part in W.R.F.
Figure 8B:
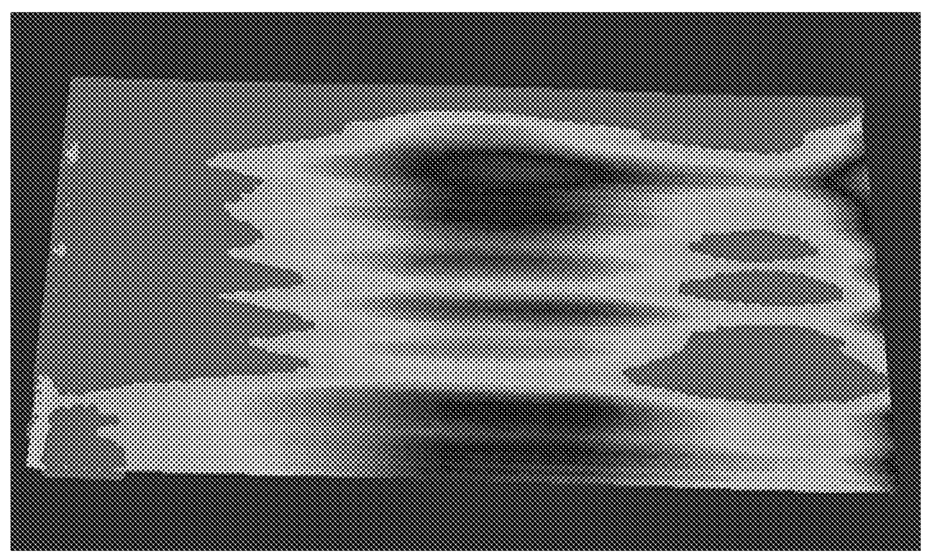
FIG. 8B shows a color coded bumping part.

The local bump and depression beneath a 3 m straight edge exceeding 6 mm is also detected. By maintaining a max. and min. height matrix within the 3 m edge, the abnormal uneven part would be detected and stored as "drepression_cloud.ply" and "bump_cloud.ply" respectively. See FIG. 8A which is a graph of the local 3 m edge bump part in W.R.F. and FIG. 8B which shows a color coded bump part.

Figure 9:
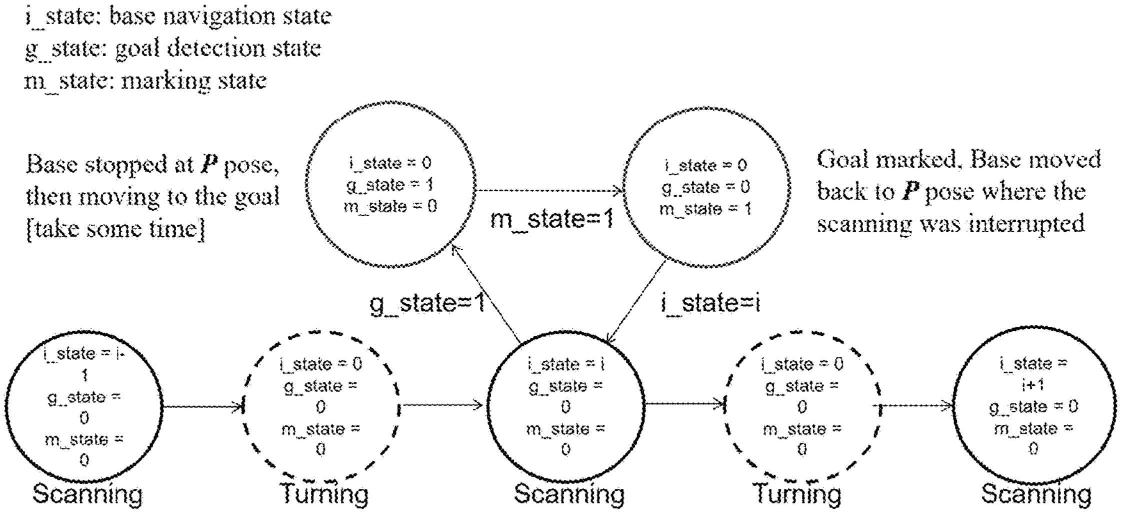
FIG. 9 is a schematic of a finite-state machine (FSM) for providing scanning motion control for the inspection robot of the present invention.
Figure 10:
FIG. 10 is a diagram of the path of the movement of the robot over a surface.

A Finite-State Machine (FSM) is designed as shown in FIG. 9 for the inspection robot coordinated actions from "Scanning": the robot obtains 3D point cloud scanning of the field ground, "Turning": the robot turns at the end of each scanning row line path, and "Marking": the robot sprays erasable paint to mark the detected unqualified goal on the ground. Thus, the robot moves in a zig-zag pattern over the field as shown in FIG. 10. Beginning in row 1 at the bottom of FIG. 10, the robot moves forward (from left to right) as shown by the arrow. At the end of row 1 the robot moves backward without turning around and moves diagonally to row 2. It travels backwards along row 2 as shown by the arrow. At the end of row 2 the robot moves forward at an angle to row 3 where it proceeds forward to the end. At the end of row 3 the robot again reverses its direction of movement without turning around, moves to row 4 and travels over row 4 backwards. The same movement is repeated for the remaining rows.

In an exemplary embodiment the inspection robot uses the SICK NAV350 Lidar for localization during the inspection process. Based on the time of flight (TOF) method the Lidar captures the reflectors in the environment and automatically calculates the absolute position and orientation of the robot. At least three reflectors are required to complete the localization.

Before the inspection process, the lidar node can automatically perform the initialization process. The lidar will automatically detect the position and the number of reflectors within the detection range set by the user. The detected reflectors during initialization will be used as a reference for real-time localization of the robot in subsequent processes.

During the navigation process, the lidar detects the position of the reflector in the environment in real time at a frequency of 8 Hz and automatically calculates the absolute position of the robot. The industrial personal computer) (IPC) 13 (FIG. 3) on the robot is connected to the lidar through an Ethernet line based on the TCP/IP protocol. The IPC queries the robot's position and orientation in the lidar's memory at a frequency of 8 hz.

The inspection robot can not only complete the entire inspection process through automatic planning and control, but the user can also control the robot when needed through the joystick. After pressing a button of the joystick, it will be automatically converted into linear and angular velocity commands that the robot can execute.

Figure 11:
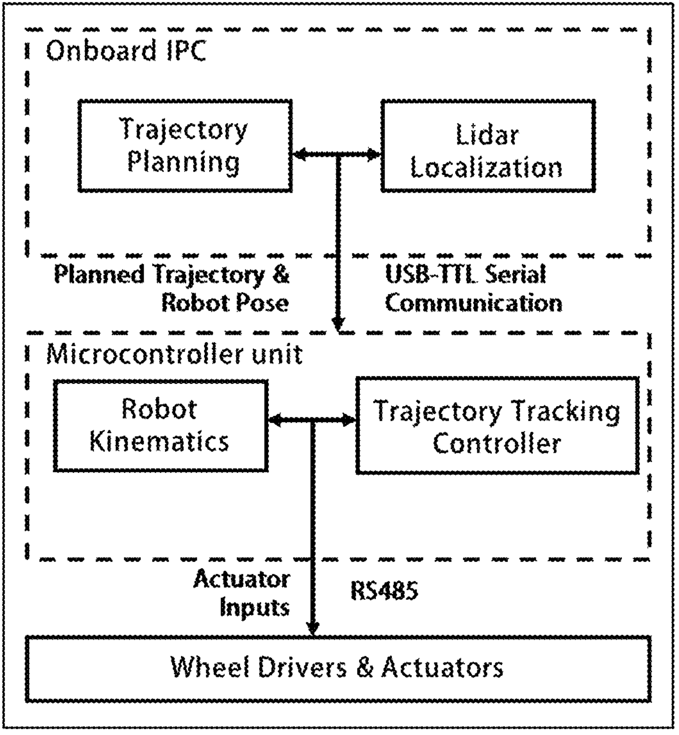
FIG. 11 is a block diagram of the motion control function for automatic inspection by the robot of the present invention.

The motion control function of automatic inspection mainly consists of three parts shown in FIG. 11. The onboard IPC is responsible for trajectory planning that allows the laser line to fully cover the entire surface for each inspection. Considering the width of the detection laser line and a certain overlap of the line-to-line, the program will automatically plan the full coverage inspection trajectory with the zigzag pattern after the user inputs the size of the court. The robot starts from a corner of the field and proceeds along one edge. The laser line used for scanning is perpendicular to the direction of travel. This means that every time the robot reaches the end of the line, the formed scanned area is a rectangle whose width is the width of the laser line, and the length is the length of the court. At the end of each line, the robot switches to the next trajectory by reversing, instead of turning, considering the minimum turning radius of the robot may not allow it to turn directly to the start of the next line. This means that the desired orientation $\theta_d=0$ of the robot does not change at the time of detection. The line-to-line spacing (e.g., 85 cm) is less than the width of the laser line (e.g., 96 cm) to provide overlap to compensate for the control error. The desired velocity of robot on the planned trajectory is fixed throughout the whole inspection process. Only the direction of the desired linear velocity of the robot is switched every time it reverses and this occurs without changing the magnitude of the velocity. The trajectory planned on the onboard IPC is sent to the microcontroller unit through serial communication, and it also periodically sends the robot a pose signal read from the lidar to the microcontroller for trajectory tracking.

The microcontroller with robot kinematics model and trajectory tracking controller controls the 4 independent wheel drivers directly via RS485 communication.

The velocity of each wheel satisfies the following constrains:

$$\begin{cases} v_l = v_{1x} = v_{2x} \\ v_r = v_{3x} = v_{4x} \\ v_f = v_{1y} = v_{4y} \\ v_b = v_{2y} = v_{3y} \end{cases}$$

The forward kinematics model calculates the velocity of the geometric center of mass (COM) based on the velocity of the left and right drive wheels, which can be expressed as:

$$\begin{bmatrix} v_x \\ \omega \end{bmatrix} = \begin{bmatrix} \frac{v_r + v_l}{2} \\ \frac{v_r - v_l}{d_{LR}} \end{bmatrix} = \begin{bmatrix} 1/2 & 1/2 \\ 1/d_{LR} & 1/d_{LR} \end{bmatrix} \begin{bmatrix} v_r \\ v_l \end{bmatrix}$$

The inverse kinematics model decomposes the velocity of the left and right driving wheels based on the velocity of the geometric center of mass COM, which can be expressed as:

$$\begin{bmatrix} v_r \\ v_l \end{bmatrix} = \begin{bmatrix} v_c + \frac{d_{LR}\omega_c}{2} \\ v_c - \frac{d_{LR}\omega_c}{2} \end{bmatrix} = \begin{bmatrix} 1 & d_{LR}/2 \\ 1 & -d_{LR}/2 \end{bmatrix} \begin{bmatrix} v_x \\ \omega \end{bmatrix}$$

The trajectory tracking controller follows the event-based planning and control framework:

The controller runs at a frequency of 8 hz limited to the frequency of querying the robot's pose from the lidar at the onboard IPC. Event-based planning and control uses a suitable motion reference variable other than time, usually the travel distance of robot. Each time the microcontroller obtains a new robot pose, it will do an orthogonal projection to the current trajectory to find the current motion reference s. A lookahead distance Δs is added to calculated travel distance. The desire state with desire robot pose and velocity $q_d=[x_r, y_r, \theta_r, v_r, \omega_r]$ can be obtained on the new travel distance s+Δs. Therefore, the error between current state and desire state can be defined in robot reference frame:

$$\begin{bmatrix} e_1 \\ e_2 \\ e_3 \end{bmatrix} = \begin{bmatrix} \cos\theta & \sin\theta & 0 \\ -\sin\theta & \cos\theta & 0 \\ 0 & 0 & 1 \end{bmatrix} \begin{bmatrix} x_r - x_c \\ y_r - y_c \\ \theta_r - \theta_c \end{bmatrix}$$

The designed trajectory tracking controller is as follows:

$$\begin{cases} v^* = v_r \cos e_3 + k_1 e_1 \\ \omega^* = \omega_r + k_2 v_r e_2 + k_3 \sin e_3 \end{cases}$$

where v*, ω* are calculated control input of robot, $[k_1, k_2, k_3]$ are positive control gain. The calculated control input will be converted into the rotational speed of the four wheels based on the robot kinematics, and the wheel rotational speed will be sent directly to the 4 independent wheel drivers via RS485-Modbus communication. A proportional integral derivative (PID) controller inside the wheel drive will automatically adjust the input current to adjust the rotational speed to the desired speed.

Figure 12:
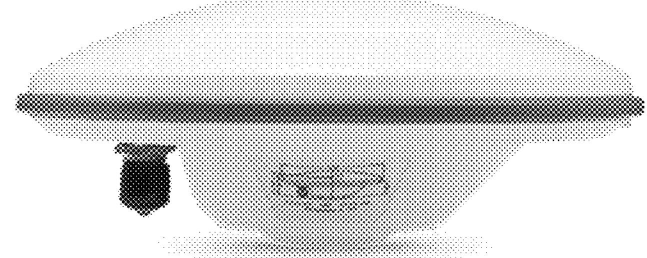
FIG. 12 is a photograph of a high precision GNSS antenna.

The robot system can not only use landmark-based lidar positioning, but in a second embodiment it can also use the Global Navigation Satellite System (GNSS) to determine its position. A photo of a high performance GNSS antenna that provides superior tracking of satellite signals including Beidou, GPS, GLONASS and GALILEO is shown in FIG. 12. It meets the requirements of high precision and multi-constellation compatibility and can be used with a variety of receivers, suitable for various occasions and environments. In addition, the dual-antenna system is placed on the robot to measure not only the three-dimensional position of the robot, but also the pitch and yaw angles. Acceptable satellite signal bands include GPS L1/L2/L5/L-B and, GLONASS L1/L2/L3, BDS B1/B2/B3 and GALILEO E1/E6/E5a/E5b.

Figure 13:
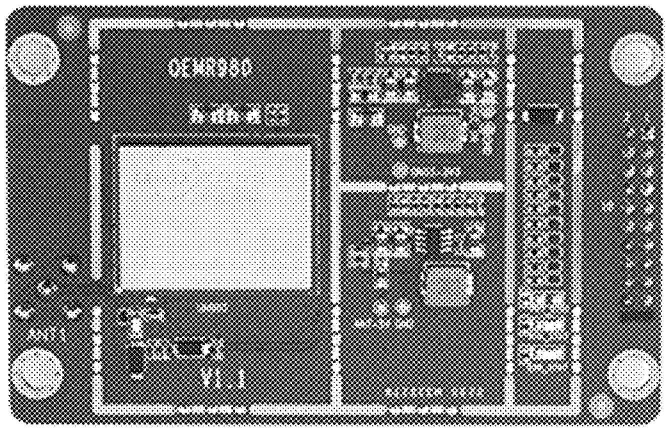
FIG. 13 is a photograph of a GNSS positioning module.

A GNSS positioning module is shown in FIG. 13. This module receive and then decode satellite signals from the antenna for single-point positioning. It can also receive modified differential signals to provide more accurate differential positioning results based on real-time kinematics (RTK).

Figure 14:
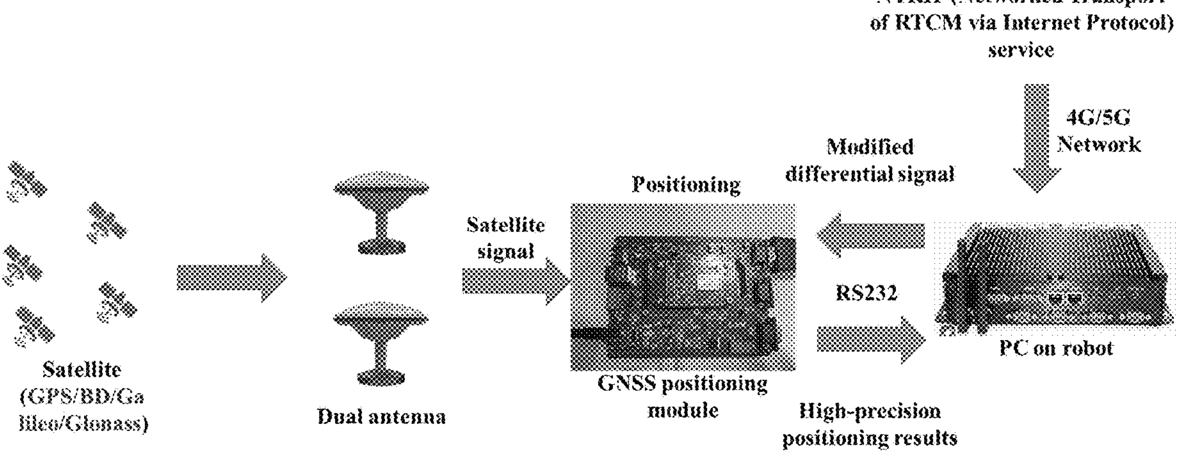
FIG. 14 is a schematic layout of the framework for a GNSS positioning system.

FIG. 14 illustrates the framework of the GNSS positioning system. The positioning method is based on the principle of carrier phase differential. The antenna as a rover station directly receives satellite signals. In the carrier phase differential technology, a rover receiver and a reference station with known coordinates are required. Both receivers receive signals from the same satellite, and since they receive signals from the same satellite, they share many common error sources, such as satellite clock bias and atmospheric delay. Through differential operation, these shared errors can be eliminated by cancellation to obtain a more accurate positioning solution. The PC 13 on the robot (FIG. 3) receives the corrected differential signals from the Virtual Reference Station (VRS) technology via the NTRIP service through the network. The correction signals and the original satellite signals are transmitted to the GNSS positioning module through a serial port for carrier phase differential calculation, and the obtained high-precision positioning result is returned to the robot. The real-time positional accuracy of RTK is about 3-5 cm.

Figure 15:
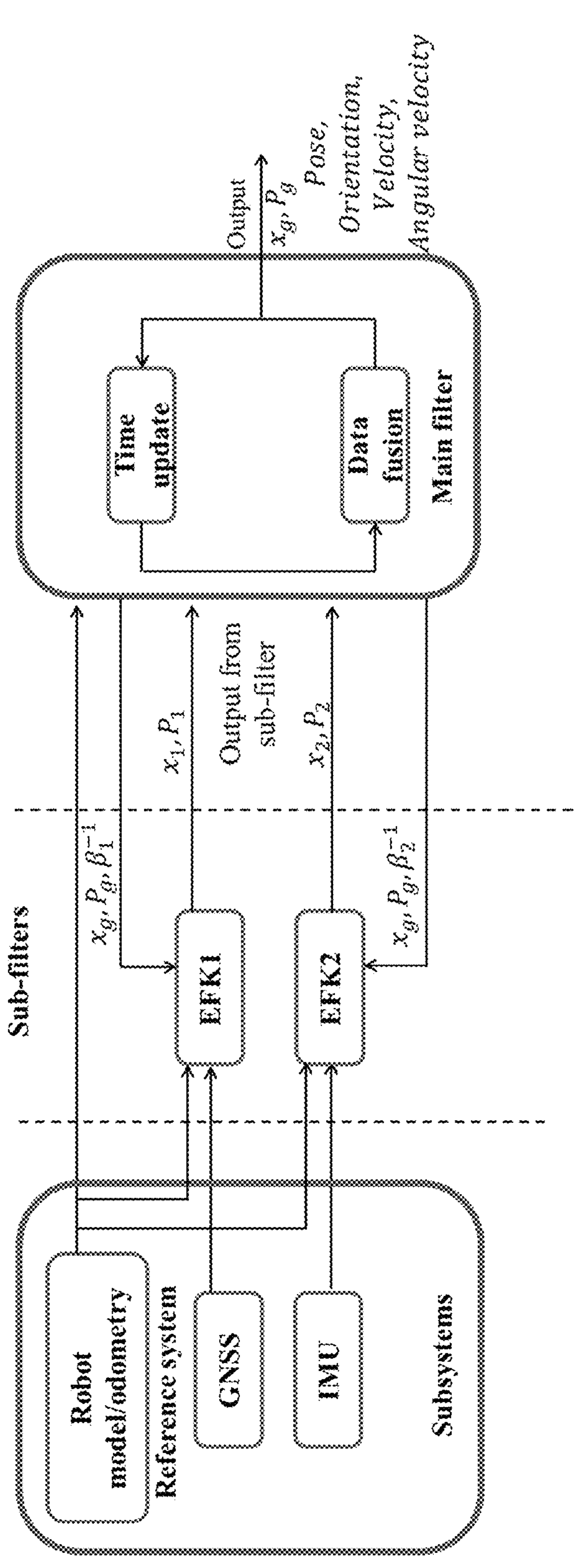
FIG. 15 is a diagram of a framework on a multi-sensor fusion system.

The GNSS positioning provides longitude, latitude, and altitude data, which cannot be directly applied to the inspection process. Through the Universal Transverse Mercator (UTM) projection, these are converted into a 2D coordinate system combined with altitude data to form the 3D coordinates of the robot. In order to achieve higher positioning accuracy and cope with GNSS-denied environments, a multi-sensor fusion framework based on federal Kalman filter as shown in FIG. 15 is used.

The Federal Kalman Filter (FKF) method achieves more precise positioning results by fusing the output of two sub-filters based on the Extended Kalman Filter (EKF). The formula of the extended Kalman filter is as follows For the nonlinear discrete-time predict and update equations:

$x_k=f(x_{k-1},u_k)+\omega_k$ Process noise: $\omega_k \sim N(0,Q_k)$ $z_k=h(x_k)+v_k$ Observation noise: $v_k \sim N(0,R_k)$ $x_k=f(x_{k-1},u_k)+\omega_k$ Process noise: $\omega_k \sim N(0,Q_k)$ $z_k=h(x_k)+v_k$ Observation noise: $v_k \sim N(0,R_k)$ 1) Predict:

Predicted state estimate: $\hat{x}_{k|k-1}=f(\hat{x}_{k-1|k-1},u_k)$

Predicted covariance estimate:

$$P_{k|k-1} = F_k P_{k-1|k-1} F_k^T + Q_k$$

Predicted state estimate: $\hat{x}_{k|k-1}=f(\hat{x}_{k-1|k-1},u_k)$

Predicted covariance estimate:

$$P_{k|k-1} = F_k P_{k-1|k-1} F_k^T + Q_k$$

2) Update:

Measurement residual: $\tilde{y}_k=z_k-h(\hat{x}_{k|k-1})$

Kalman gain:

$$K_k = P_{k|k-1} H_k^T \left(H_k P_{k|k-1} H_k^T + R_k\right)^T$$

Updated state estimate: $x_{k|k}=\hat{x}_{k|k-1}+K_k\tilde{y}_k$

Updated covariance estimate: $P_{k|k}=(I-K_kH_k)P_{k|k-1}$

Measurement residual: $\tilde{y}_k=z_k-h(\hat{x}_{k|k-1})$

Kalman gain:

$$K_k = P_{k|k-1} H_k^T \left(H_k P_{k|k-1} H_k^T + R_k\right)^T$$

Updated state estimate: $x_{k|k}=\hat{x}_{k|k-1}+K_k\tilde{y}_k$

Updated covariance estimate: $P_{k|k}=(I-K_kH_k)P_{k|k-1}$

Sub-filter 1 integrates GNSS positioning results with a robot odometry model based on wheel encoders. Sub-filter 2 combines robot odometry with measurements from the Inertial Measurement Unit (IMU). In the main filter, the results of the two sub-filters are fused according to manually set weight coefficients β_i. When the GNSS signal is unavailable, the weight of sub-filter 1 is set to zero the weight of sub-filter 2 is set to one, and the positioning system solely relies on the results from the sub-filter 2 based on the IMU and robot odometry until a viable GNSS signal is acquired again.

Figures 16A, 16B, 16C, 16D:
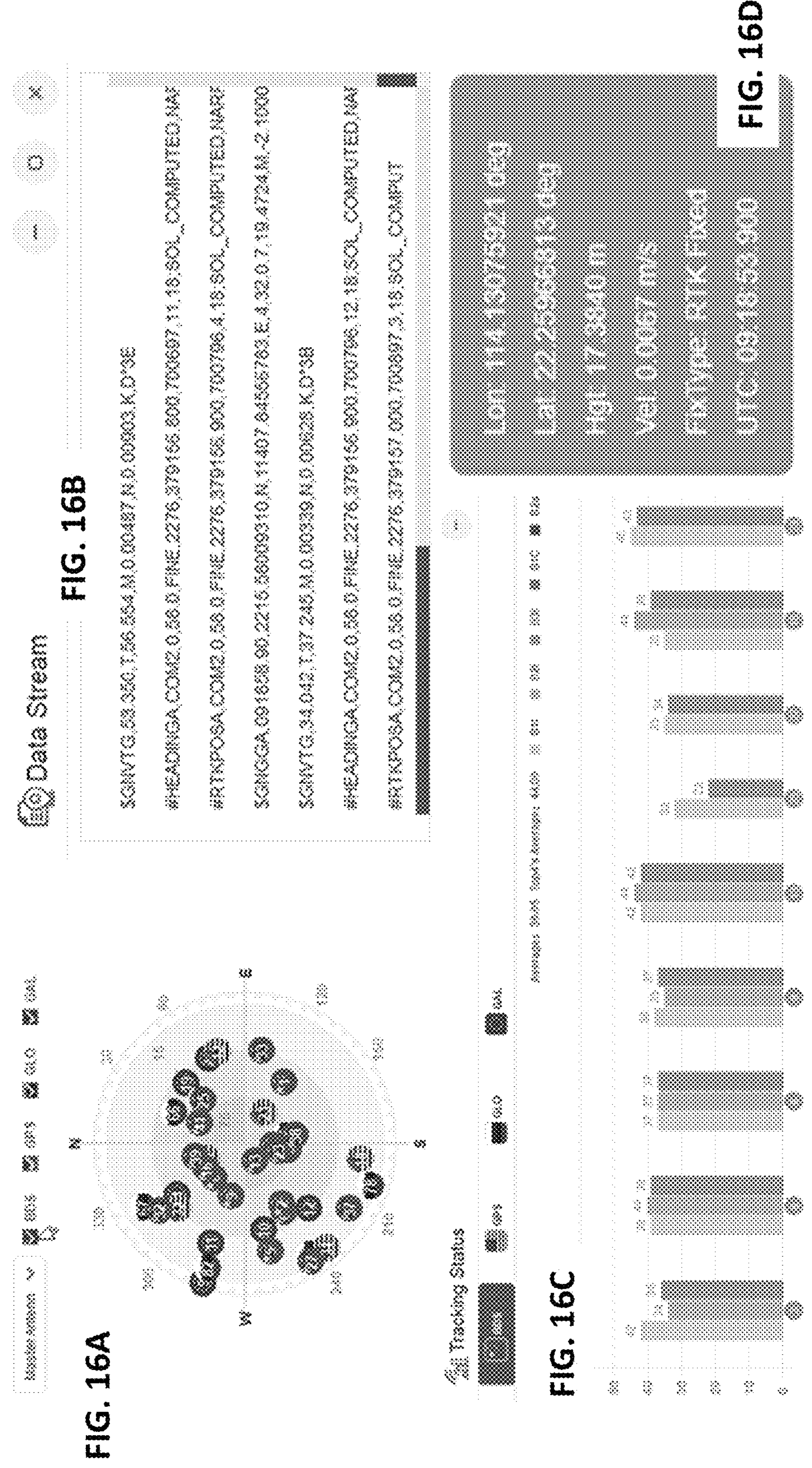
FIG. 16A illustrates the locations of all satellites observed by the antenna at the current position according to the present invention.
FIG. 16B shows the raw data stream from the GNSS positioning module of the present invention.
FIG. 16C shows the signal strength and carrier-to-noise-density ratio of some satellites currently observed in different bands and FIG. 16D shows the longitude, latitude, altitude and velocity data read from the original data stream.

The output of the GNSS system is shown in FIGS. 16A-D. In particular, FIG. 16A shows all of the satellites observed by the antenna at its current position. FIG. 16B shows the raw data stream from the GNSS positioning module. In turn, FIG. 16C shows the signal strength and carrier-to-noise-density ratio of some satellites currently observed in different bands. Finally, FIG. 16D shows the longitude, latitude, altitude and velocity data read from the original data stream.

While the invention is explained in relation to certain embodiments, it is to be understood that various modifications thereof will become apparent to those skilled in the art upon reading the specification. Therefore, it is to be understood that the invention disclosed herein is intended to cover such modifications.

The invention claimed is:

1. A system for inspecting surfaces comprising:

a mobile base that moves over the surface on wheels, sensors for base navigation located on the base, sensors for surface inspection located on the base that detect defects in the surface over which the mobile base moves in the form of bumps in the surface and depressions in the surface greater than a threshold value, a communication system located on the base, a robot computer located on the base and executing software for controlling the sensors and the communication system, a host computer that executes software modules for base motion planning and navigation, position location, point cloud acquisition and processing, surface modelling and analysis, multi module coordination and user interfaces, wherein the host computer delivers commands to the robot computer and receives signals from the robot computer through the communication system; and a spray device under the control of the point cloud acquisition and processing software module for spraying only an erasable paint or chalk on only the surface over which the mobile device moves to mark where defects have been located in the surface.

2. The system of claim 1 wherein the inspection procedure has the following steps:

the robot moves in a zigzag pattern trajectory over the surface;

for every fixed distance, a 3D point cloud of the surface is generated and the location of the point cloud with respect to the world coordinate system is recorded, the location of the point cloud is based on SLAM for spatial mapping;

at the same time, a high-resolution photo of the corresponding area on the surface is recorded by the camera;

both the point cloud and the photo are transmitted to the host computer for processing and analysis, which information is used in a new 3D detection and image processing algorithm to find flaws in the surface like bumps or depressions; and if irregular flaws are detected, the robot marks with the spray device such a problematic location directly on the surface over which the mobile base moves.

3. The system of claim 2 wherein the robot moving in the zigzag pattern trajectory comprises the robot following steps of:

moving forward along a first scan row to the end, reversing its direction without turning around and moving backward at an angle to the second scan row, moving backwards along the second scan row to the end, reversing its direction without turning around and moving forward at an angle to the third row, and moving forward along the third scan row to the end.

4. The system of claim 1 wherein the sensors for navigation are based on lidar positioning.

5. The system of claim 1 wherein the sensors for navigation are based on Global Navigation Satellite System (GNSS).

6. The system of claim 5 wherein the GNSS comprises:

a reference station of the GNSS with known coordinates that receives signals from a satellite of the GNSS;

an antenna mounted on the mobile base that acts as a rover station that directly receives signals from the same satellite as the reference station, whereby through differential operation the antenna and reference station eliminate shared errors and obtain a more accurate positioning solution; and wherein the corrected differential signals are transmitted to a GNSS position location module.

7. The system of claim 1 further including camera for taking images of defects located in the surface.

8. The system of claim 1 wherein the sensors for surface inspection comprise:

a line projecting laser that projects a laser line from a bracket on and above the base vertically downward toward the surface; and a 3D camera located on the base and imaging the laser line at an angle, said camera analyzing an image of the laser line to locate the laser line and determine any change in the surface based on its image of the laser line.

9. The system of claim 1 further including an inertial measurement unit (IMU) in the form of a gyroscope mounted on the base that obtains robot position and attitude data during its movement over the surface.

10. The system of claim 1 further including at least one ultrasonic safety protection sensor to detect obstacles and prevent collisions with the base.

11. The system of claim 10 wherein ultrasonic safety protection sensors are installed on all sides of the mobile base.

* * * * *